United States Patent [19]
Bahnemann et al.

[11] Patent Number: 4,816,975
[45] Date of Patent: Mar. 28, 1989

[54] PHOTOGRAPHY LIGHT

[75] Inventors: Volker W. Bahnemann, Greenwich, Conn.; Stanislaw Loth, Nauet, N.Y.

[73] Assignee: Arriflex Corporation, Blavelt, N.Y.

[21] Appl. No.: 69,506

[22] Filed: Jul. 2, 1987

[51] Int. Cl.[4] .................................................. F21V 7/00
[52] U.S. Cl. ........................................ 362/308; 362/17; 362/32; 362/297; 362/346
[58] Field of Search ............ 362/16, 17, 18, 32, 362/297, 298, 300, 301, 302, 307, 308, 346

[56] References Cited

U.S. PATENT DOCUMENTS 4,233,650 11/1980 Hagner et al. ............... 362/32
4,561,043 12/1985 Thompson ...................... 362/32

Primary Examiner—Stephen F. Husar
Attorney, Agent, or Firm—Toren, McGeady & Associates

[57] ABSTRACT

A light fixture for providing a cool uniform illumination into a photography field which is adjustable in intensity while maintaining a uniform color temperature. The light fixture includes a light source, an adjustable shutter for adjusting the amount of light passing therethrough, a reflector mirror having a dichroic heat coating thereon for reflecting the light from the shutter while passing any heat contained therein, and a round reflector for receiving the light from the reflector mirror through an end face and for dispersing the light through the circumference thereof by internal reflectance.

5 Claims, 5 Drawing Sheets

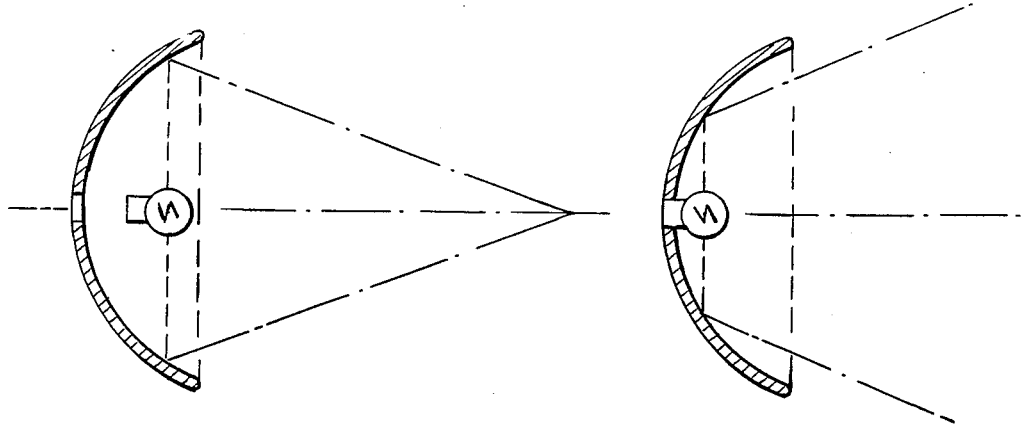
PRIOR ART
FIG. 2
PRIOR ART
FIG. 1
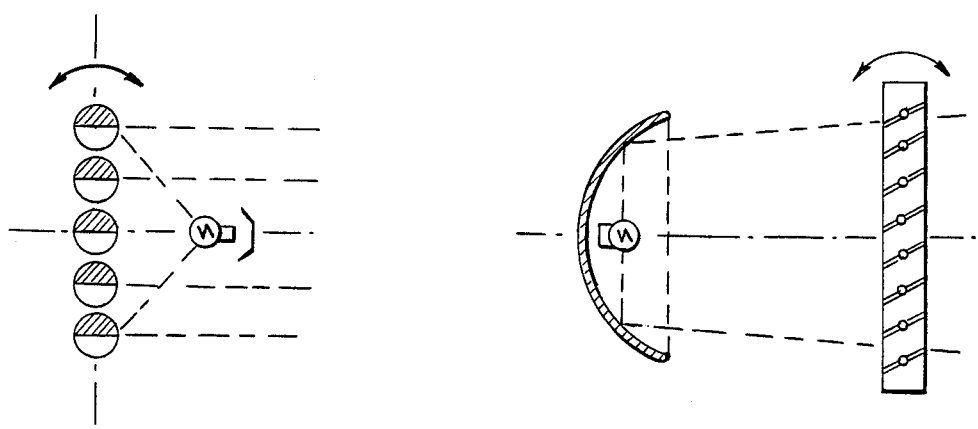
PRIOR ART
FIG. 3
PRIOR ART
FIG. 4

PHOTOGRAPHY LIGHT

BACKGROUND OF THE INVENTION

1. Field of the Invention

The invention relates to photography lights, and particularly to photography lights for providing "fill" illumination.

In the filming process with a film or video camera, there is need for adjustable lighting equipment which remains cool in temperature while allowing the photographer to continuously change the light value and intensity without changing the beam angle or color temperature.

2. Description of Related Art

Most conventional lights accomplish a change in intensity by either varying the position of a bulb relative to the reflector or by varying the voltage to the bulb.

FIGS. 1 and 2 show arrangements of light fixtures which produce, respectively, a wide-angle and a spot light. While these arrangements change the intensity of light falling on an object in the photographing field, as compared to the spot light, the wide-angle light sheds a significant amount of light on the surrounding area thereby changing the balance of light in this surrounding area.

There are, however, lights which accomplish this change in intensity without changing the beam angle or color temperature. These lights accomplish this change in intensity by changing the reflectance of the reflector of the lighting arrangement from white to black, thus changing the amount of light emitted from the arrangement.

U.S. Pat. No. 4,200,902 to Intrator discloses a photography light which includes alternate black and white strips arranged behind a light source for controlling the amount of light reflected into the photographing field. The ratio of the area of the black strips to the white strips is adjustable by the photographer to effectively vary the intensity of the light into the photographing field.

An arrangement known in the prior art includes a plurality of rods arranged behind a light source as in the patent to Intrator. As shown in FIG. 3, the rods are formed such that half of the surface, around the circumference thereof, is a white, reflective color, while the other half of the surface is a black absorptive color. By controlling the rotational position of the rods in synchronism, the photographer is able to control the intensity of the light into the photographing field.

Another arrangement of the prior art light fixtures, as shown in FIG. 4, positions controllable shutters in front of the light fixture to control the amount of light emitted therefrom.

While the above light fixtures effectively control the intensity of the light into the photographing field, each of these fixtures produces an irregularity in the intensity of the light which may show up in the photographing field as an alternating array of light and dark stripes. In other words, neither of these lights produces uniform illumination. In addition, since the illuminating light is provided directly by bulb(s), the above light fixtures radiate a great deal of heat into the photographing field.

SUMMARY OF THE INVENTION

An object of the present invention is to provide an adjustable photography light which exhibits uniform light intensity in the photographing field.

Another object of the present invention is to provide an adjustable photography light which remains cool in temperature.

A further object of the present invention is to provide an adjustable photography light which exhibits a uniform color temperature throughout its adjustable range.

The above objects are achieved in a photography light having a light source, shutter means for controlling an amount of light from the light source, means for reflecting the light from the light source while refracting the heat therefrom, and reflector means for uniformly dispersing the light reflected by said reflecting means.

BRIEF DESCRIPTION OF THE DRAWINGS

With the above objects and advantages in mind as will hereinafter appear, the subject invention will be described with reference to the accompanying drawings, in which:

FIG. 1 shows a prior art light fixture which provides a wide angle illumination;

FIG. 2 shows a prior art light fixture which provides a spot light;

FIG. 3 shows a prior art light fixture in which the intensity of the light is adjusted by varying the reflectance of the reflector therein;

FIG. 4 shows a prior art light fixture in which the intensity of the light is adjusted by varying the angle of shutters positioned in front of the light source;

DESCRIPTION OF THE PREFERRED EMBODIMENTS

Figure 5A:
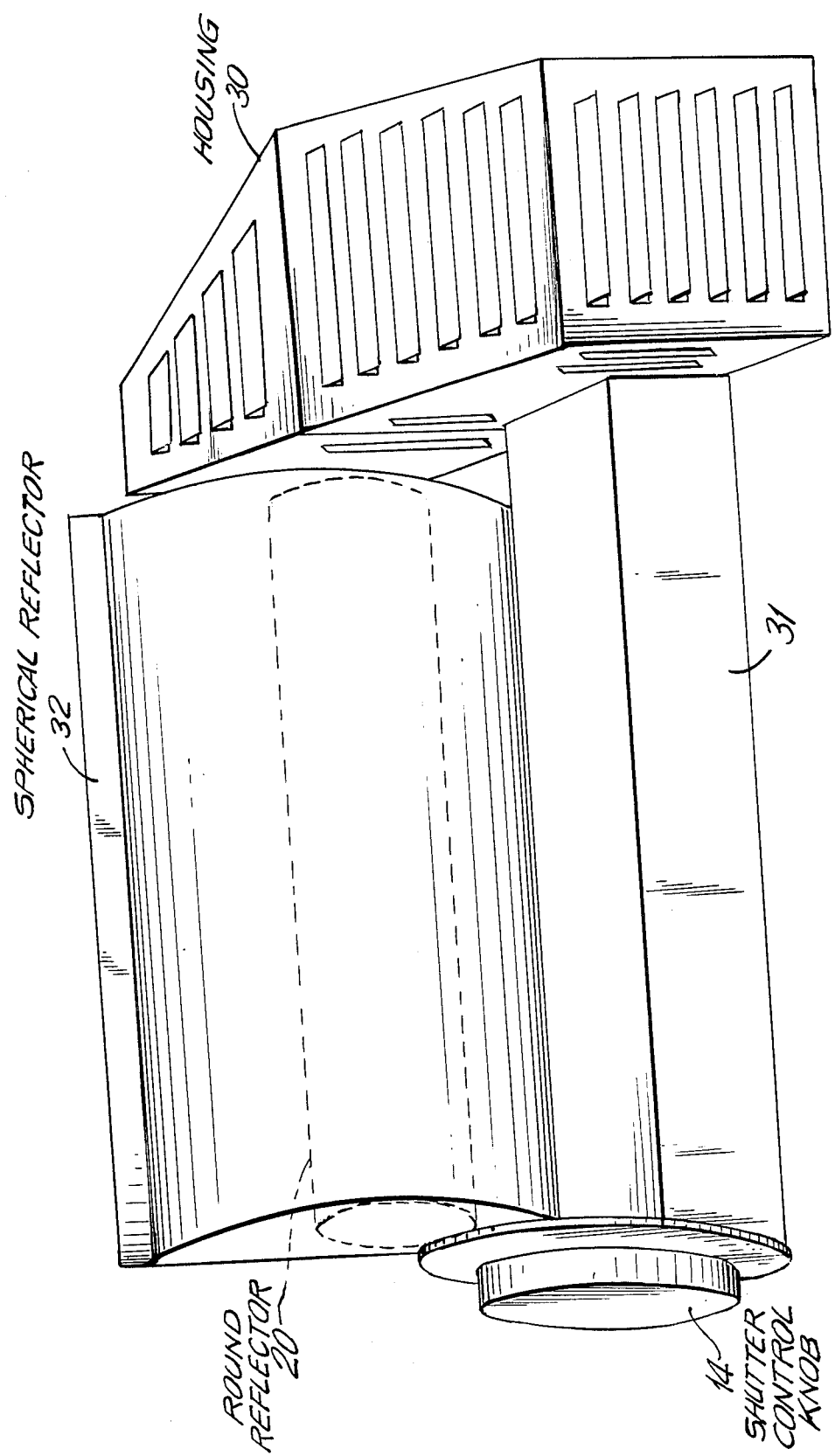
FIGS. 5A-5C show a first embodiment of the present invention.
Figure 5B:
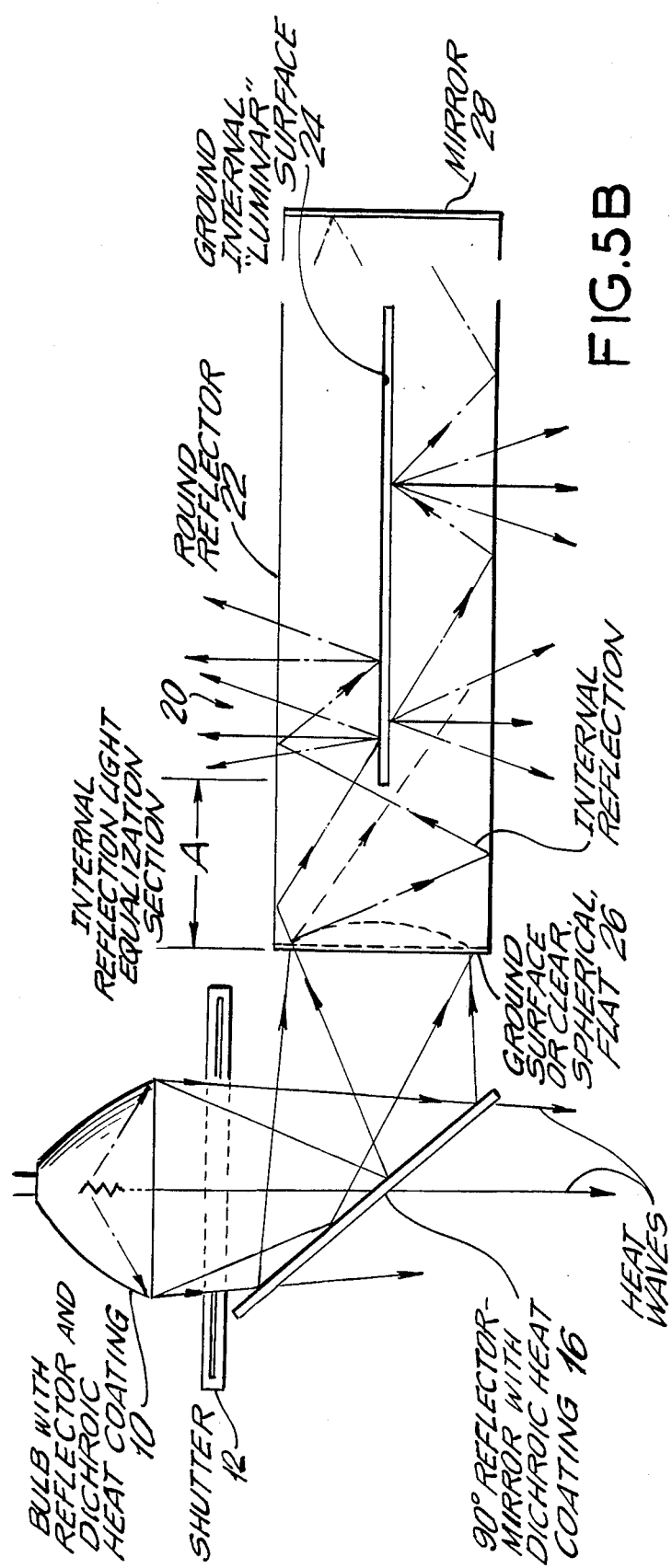

As shown in FIG. 5B, the subject invention includes a light source 10 of known design selected for producing the desired color temperature. A shutter or iris diaphragm 12 is positioned in front of the light source 10 for controlling the amount of light passing therethrough. A reflector mirror 16 is positioned in front of the shutter 12 for reflecting the light from the shutter 12 preferably at a 90° angle. The mirror 16 includes a dichroic heat coating for allowing heat from the light source 10 to pass therethrough.

The light reflected from the mirror 16 is then introduced into a round reflector 20. As shown in detail in FIGS. 6A-6C, the round reflector 20 is made of a polished acrylic or pyrex rod 22 with an internal ground surface slot 24. The rod 22 may have a flat or spherical entrance face 26 which may be either clear or a ground surface. The opposite end of the the rod 22 is closed with a mirror coating 28.

Figure 5C:
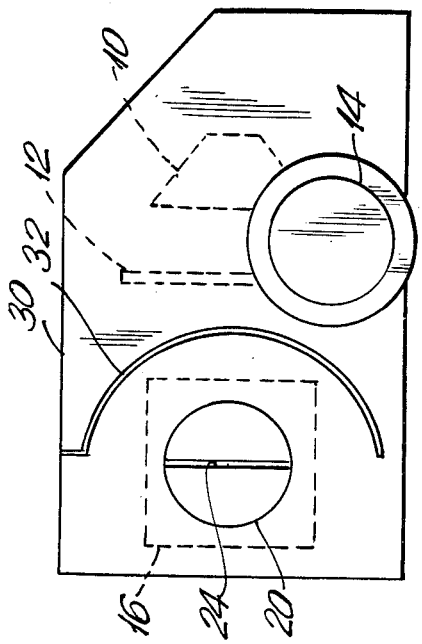

As shown in FIG. 5A, the light fixture further includes a housing 30 enclosing the light source 10, the shutter 12 and the mirror 16 for preventing stray light therefrom from entering the photography field. The opening of the shutter 12 is adjusted by a control arrangement of which a control knob 14, located on the opposite side of the light fixture from the housing 30, is operatively connected to the shutter 12, by a transmission member (not shown) passing through a channel 31, connecting with the housing 30. A spherical reflector 32 is positioned about the round reflector 20 for directing the light therefrom into the photography field. As shown in FIG. 5C, the spherical reflector 32 surrounds the rear half of the round reflector 20, and reflect light from this rear half back into the round reflector 20, or into the photography field.

Figure 6B:
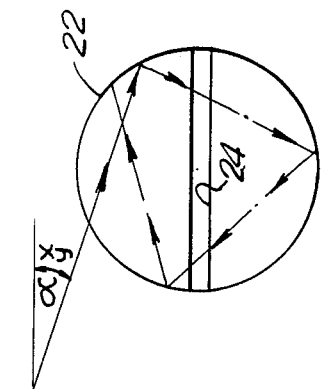
FIGS. 6A-6C show details of the round reflector used in the invention.
Figure 6A:
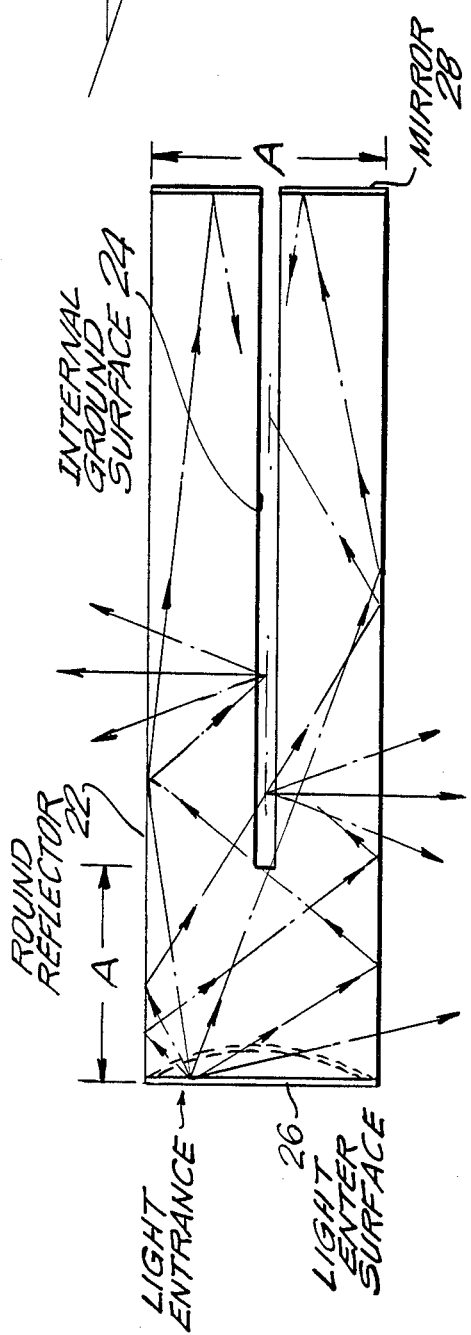
Figure 6C:
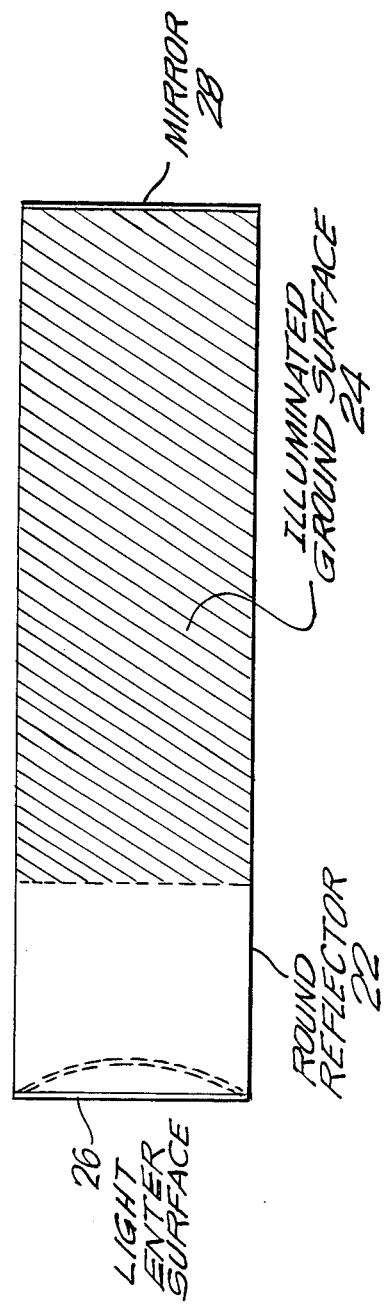

As shown in FIGS. 6A-6C, the light fixture of the subject invention uses internal reflectance in the section A of the round reflector 20 to disperse the light reflected by the mirror 16 thereby providing uniform illumination of the ground surface of the slot 24. The ground surface slot 24 is situated substantially at the optical center of the round reflector 20, and is thereby affected by all of the internally reflected light beams. The thus illuminated ground surface slot 24 then emits light rays which exit through the surface of the round reflector 20. Since the power supplied to the light source 10 is kept constant, the color temperature of the light therefrom, and, consequently, that portion thereof dispersed by the round reflector 20, remains constant. Since the round reflector 20 is the apparent light source, the light therefrom, while changeable in intensity, remains diffused.

Figure 7:
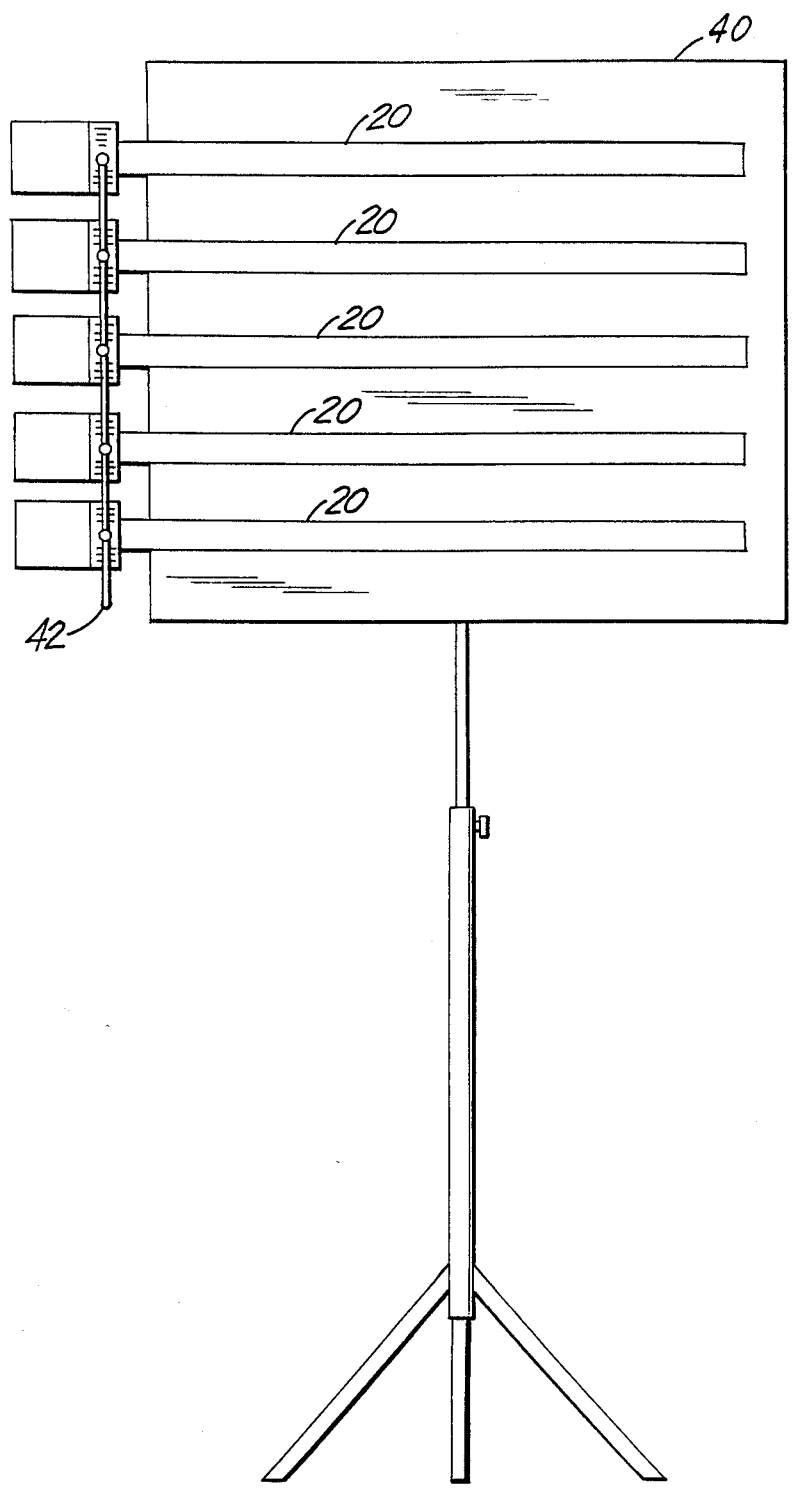
FIG. 7 shows a second embodiment of the present invention which uses a plurality of the light fixtures shown in FIG. 5.

FIG. 7 shows a second embodiment of the invention in which a plurality of the light fixtures as shown in FIGS. 5A and 5B. Instead of separate reflectors 32, this embodiment uses a single reflector 40 for all of the round reflectors 20. In addition, the control arrangements for each of the shutters 12 are coupled together and are controlled by a single handle 42.

Figure 8:
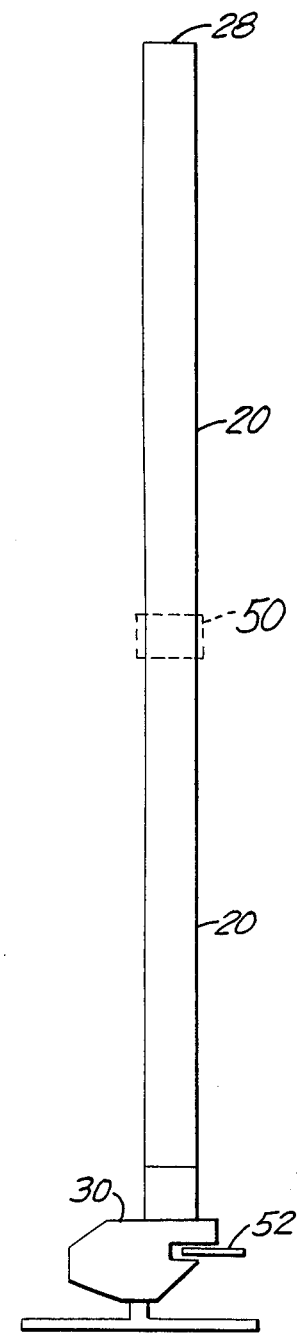
FIG. 8 shows a third embodiment of the present invention.

FIG. 8 shows a third embodiment of the invention in which the round reflector 20 is vertically arranged and is extended by joining several round reflectors 20 using a connecting collar 50. It should be apparent that only the last of the round reflectors 20 should include the mirror coating 28 on the end thereof. The light fixture may also include a slot in the housing 30, which is positioned between the mirror 16 and the round reflector 20, into which various color filters 52 may be inserted to change the color of the light provided by the light fixture.

While the subject invention has been directed toward the field of photography, it should be apparent that the subject light fixture may also be used as an accent light in the home environment or in industrial applications where constant color temperatures and/or cool light sources are required.

Numerous alterations of the structure herein disclosed will suggest themselves to those skilled in the art. However, it is to be understood that the present embodiments are for purposes of illustration only and not to be construed as limitations of the invention. All such modifications which do not depart from the spirit of the invention are intended to be included within the scope of the appended claims.

What is claimed is:

1. A light fixture comprising:
    a light source;
    a shutter having an adjustable opening therein for allowing an adjustable amount of light from the light source to pass therethrough;
    a reflector mirror positioned in front of said shutter for reflecting the light emerging therefrom, said mirror including a dichroic heat coating for allowing any heat in said light to pass therethrough; and
    a round reflector for receiving the light reflected by said reflector mirror and comprising a polished clear rod having an axial ground slot formed therein, said rod having a light entrance face receiving the reflected light and a mirror coating on an end opposite to said entrance face, whereby said reflected light is internally reflected in said round reflector and illuminates the axial ground slot therein, light from the ground slot then exiting from said round reflector, the surface thereof focusing the exiting light at a short focal length distance.

2. A light fixture as claimed in claim 1, wherein said polished clear rod is acrylic.

3. A light fixture as claimed in claim 1, wherein said polished clear rod is glass.

4. A light fixture as claimed in claim 1, wherein said light fixture further includes a housing surrounding said light source, said shutter and said reflector mirror, said housing preventing stray light from being emitted by said light fixture.

5. A light fixture as claimed in claim 4, wherein said light fixture further includes a spherical reflector surrounding a rear half of said round reflector defined by said axial ground slot, whereby light exiting from this rear half is reflected by said spherical reflector both back into the ground reflector and into a photography field.

* * * * *